Patented Sept. 23, 1941

2,256,610

UNITED STATES PATENT OFFICE 2,256,610

PROCESS FOR PRODUCING ALKYL ARYL SULPHONATES

Hyym E. Buc, Roselle, N. J., assignor to Standard Oil Development Company, a corporation of Delaware No Drawing. Application August 12, 1938, Serial No. 224,505

12 Claims. (Cl. 260—505)

This invention relates to an improved method for producing valuable wetting agents and detergents. It relates more particularly to the preparation of alkylated aryl sulphonic acids and their corresponding salts.

The preparation of alkyl aryl sulphonates by bringing a mixture of an alkylating agent, such as an olefin, and an aromatic compound, such as a phenol, into reaction in the presence of a strong sulphuric acid is already known. The processes as usually conducted require a large excess of the sulphuric acid reagent, which is subsequently diluted or neutralized, and considerable expense is involved in its loss or concentration. Attempts to decrease the amount of the sulphuric acid reagent by using stronger acids, such as the fuming acids containing relatively high concentrations of sulphuric anhydride, often result in the production of relatively inferior products, particularly when the alkylating agent contains long and highly branched carbon chains.

It has now been found that, in cases where the alkylating agent is an olefin, improved results are obtained by bringing the alkylating agent and the aromatic compound into reaction in the presence of a strong sulphuric acid of suitable strength for production of the desired products, but in a quantity insufficient to complete the reaction. After the reaction has been permitted to proceed until the reaction rate slows down appreciably, the mixture is permitted to settle and the lower layer of acid, which is partially diluted by water formed in the reaction, is withdrawn. Additional fresh condensing agent, such as an additional quantity of acid of the same strength used in the first reaction stage, is then added and the reaction proceeds as before. The reaction is usually carried satisfactorily to completion in this second stage. However, if found desirable in any particular case, the mixture may be settled, the partially diluted condensing agent withdrawn, fresh condensing agent added, and the reaction continued through as many additional stages as is found desirable. After removal of the aqueous layer resulting from the last addition of acid, the reaction mixture may be neutralized with a suitable base, preferably a water-soluble base such as the amines and the alkalies, to prepare salts of the alkyl phenol sulphonic acids which are valuable wetting agents and detergents. This step may be omitted and the alkyl phenol sulphonic acids themselves may be used directly for such purposes in cases in which acidic wetting agents and detergents are desired.

This process has been found particularly advantageous in preparing sulphuric acid derivatives of alkylated phenols from phenols and olefins of relatively high molecular weight, such as the olefin polymers formed by polymerization and condensation of one or more olefins, especially the olefin polymers of isobutylene such as tri-isobutylene and tetra-isobutylene. These olefin polymers are quite sensitive to strong mineral acids, such as fuming sulphuric acid, and are adversely affected thereby. If acid of proper strength for the preparation of high quality alkyl phenol derivatives in one stage is used, extremely large quantities of acid are found necessary to secure satisfactory yields of the desired products. It has been found that this amount of acid can be greatly decreased, with no reduction in quality of the products, by carrying out the reaction in the manner described herein.

The following example is presented to illustrate suitable methods for carrying out this invention, but it is understood that the invention is not to be limited to the particular conditions or reagents described therein:

Example I

Di-isobutylene boiling between 100 and 103.5° C. (obtained by careful fractional distillation of the polymers obtained on polymerizing isobutylene with 60% aqueous sulphuric acid) is heated to 40° C. and about 10 parts by weight of an active clay such as super filtrol (freshly dried at 110° C. for several hours) is added slowly with stirring. The mixture is stirred vigorously and cooled to keep the temperature from rising above 50° C. After all the clay has been added, the mixture is stirred for about 3 hours, maintaining the temperature near 50° C. by heating, if necessary. The reaction is stopped when the refractive index of withdrawn samples reaches 1.447 at 20° C. This represents equilibrium conditions for this operating procedure. The clay is removed by filtering and unreacted material is removed from the filtrate by distilling with steam. The distillation residue consists of a substantially pure mixture of tetra-isobutylenes.

100 parts by weight of phenol and 280 parts of the tetra-isobutylene, above described, are placed in a reaction vessel and 100 parts of an acid inert kerosene are added. Then 1.0 mol of 66° Bé. sulphuric acid, based on the phenol, is added slowly with stirring. The temperature is kept at 86° F., or slightly lower, by cooling the mixture which is stirred vigorously for six hours and then allowed to settle. Two layers are formed, the lower layer being unreacted sulphuric acid of about 75 to 80% concentration, which is withdrawn. One-half mol of 66° Bé. sulphuric acid is again added and the mixture again stirred for six hours as before and then permitted to settle. The lower acid layer formed is again withdrawn. 1000 parts of 54° naphtha are then added as diluent and the mixture is then neutralized with sodium hydroxide in 47 to 49% strength aqueous solution. It is then heated for two hours while refluxing the naphtha in order to dissociate any di-alkyl sulphates present, and is then cooled and permitted to settle. The water layer is drained off and the naphtha layer, containing the desired products in solution, is filtered. 40 parts by weight of dried decolorizing clay are added and the mixture is heated to refluxing temperatures for two to ten hours. The clay is removed by filtering and the naphtha evaporated to a thick residue which is dried on a drum drier. There is thus obtained a light colored, solid product consisting of alkyl phenol sulphonate sodium of high purity in a yield of about 98%.

This total product is soluble in ether, alcohol and in all common organic solvents. It is also soluble in spray oils, gas oils and in other hydrocarbon liquids. This product has a wetting number, in 0.2% concentration in neutral solution, of about 2.0 seconds (method of Draves and Clarkson, Proc. Am. Assoc. Textile Chem. Colorists, 1931, 109).

The amounts of sulphuric acid used in the various steps may be varied widely if desired. If substantially smaller amounts of acid are used in each step, it may be found necessary to increase the number of treating steps in order to obtain complete reaction.

The yield of the desired wetting agents is greatly decreased if it is attempted to conduct the entire operation in one step. For example, using the same reagents and reaction conditions described above, a yield of only 50 to 60% of the desired tetra-isobutyl phenol sulphonate sodium is obtained even with a much larger amount of sulphuric acid than the total amount used in both steps in the above example. Also, the reaction product of such a one-step process contains large amounts of impurities and by-products and it is much more difficult to separate from this product a wetting agent of high quality.

It is desirable to use naphtha or some other water-immiscible diluent during the reaction in order to keep the viscosity of the reaction mixture low, thereby increasing both the rate of reaction and the ease of separation of the resulting acid layer.

The neutralization operation is preferably conducted with the addition of as little water as possible in order to avoid emulsification. The neutralization may be carried out by adding only a solid alkali such as sodium hydroxide or soda ash after a little water, enough to permit ready reaction between the alkali and the sulphonic acids, is first added. Limiting the water to a small amount also greatly increases the concentration of inorganic salts in the resulting aqueous layer and aids in the separation and recovery of high yields of wetting agents of high purity. Sufficient naphtha or other immiscible solvent for the sulphonates is preferably added prior to or during the neutralization to maintain a low viscosity of the reaction mixture. In case difficulties are encountered due to emulsification, the emulsion may be broken by the addition of isopropyl alcohol.

Other aromatic compounds having at least two replaceable hydrogen atoms connected to the aromatic nucleus may be used instead of the phenol in the above-described process. Such aromatic compounds include naphthalene, anthracene and the corresponding hydroxyl derivatives such as naphthol, polyhydroxy phenols, cresoles and other substituted phenols.

Other olefinic alkylating agents, having preferably above about eight carbon atoms per molecule, may be used in place of the tetra-isobutylene in the above-described process. Such alkylating agents include the olefins obtained by dehydration of fatty alcohols and other aliphatic alcohols isomeric therewith, olefins obtained by cracking or dehydrogenation of hydrocarbons of suitable molecular weight such as naphthenic and paraffinic hydrocarbon oils, petrolatum and paraffin wax.

While the reaction condition may be varied widely and different temperatures and acid concentrations may be used in different steps, the reaction is preferably conducted with concentrated sulphuric acid of a strength of about 90 to 98%, and at temperatures below about 70° C. The order of addition of the reagents to the reaction vessel may also be varied from that shown above, for example, the alkylating agent may be added to a mixture of the aromatic compound and the acid.

This invention is not to be limited to any examples or theoretical explanations, all of which are presented herein solely for the purpose of illustration, but is limited only by the following claims in which it is desired to claim all novelty insofar as the prior art permits.

I claim:

1. Process for preparing an alkyl phenol sulphonate comprising bringing into reaction in an inert diluent, 1 mol of phenol, about 1 mol of isobutylene polymer, and about 1 mol of concentrated sulfuric acid, at a temperature not substantially higher than 30° C., settling the reaction mixture and separating the resulting aqueous acid layer, then adding about ½ mol of concentrated sulphuric acid to the remaining reaction mixture and completing the reaction at about the same temperature as in the first reaction stage.

2. Process for preparing an alkyl phenol sulphonate detergent aid comprising bringing into reaction in an inert diluent about 1 mol of tetra-isobutylene, 1 mol of phenol, and about 1 mol of concentrated sulphuric acid at a temperature of about 30° C. with agitation, settling the reaction mixture and separating therefrom the resulting aqueous acid phase, then adding about ½ mol of concentrated sulphuric acid to the remaining reaction mixture and completing the reaction at a temperature of about 30° C., separating the resulting aqueous acid phase from the reaction mixture, then neutralizing the remaining reaction mixture with an alkali.

3. A process for preparing an alkyl aryl sulphonate which comprises bringing into reaction an olefin, an aromatic compound having at least two replaceable nuclear hydrogen atoms, and an amount of concentrated sulpuric acid sufficient to partially, but only partially, complete the reaction, conducting the reaction at a temperature not substantially higher than 30° C., separating the resulting aqueous acid phase from the reaction mixture, then adding additional sulphuric acid of substantially the same strength as that used in the first stage of the reaction and conducting a second stage of reaction with sulphuric acid at about the same temperature as in the first reaction stage.

4. Process according to claim 3 in which the said aromatic compound is a phenol having at least two replaceable nuclear hydrogen atoms.

5. Process according to claim 3 in which the said reaction is conducted in an inert diluent.

6. A process for preparing an alkyl aryl sulphonate which comprises bringing into reaction an olefin, a phenol having at least two replaceable nuclear hydrogen atoms, and an amount of concentrated sulphuric acid sufficient to partially, but only partially, complete the reaction, conducting the reaction at a temperature not substantially higher than 30° C., separating the resulting aqueous phase from the reaction mixture, then adding additional sulphuric acid of substantially the same strength as that used in the first stage of the reaction and conducting a second stage of reaction with sulphuric acid at about the same temperature as in the first reaction stage, separating the resulting aqueous acid phase from the reaction mixture, and then neutralizing the reaction mixture with a water-soluble base.

7. Process according to claim 6 in which the said water-soluble base is a substantially anyhdrous alkali.

8. A process for preparing an alkyl phenol sulphonate which comprises bringing into reaction phenol, an isobutylene polymer and an amount of concentrated sulphuric acid sufficient to partially, but only partially, complete the reaction, conducting the reaction at a temperature not substantially higher than 30° C., separating the resulting aqueous acid phase from the reaction mixture, and then adding sulphuric acid of substantially the same strength as that used in the first stage of the reaction and conducting a second stage of reaction with sulphuric acid at about the same temperature as in the first reaction stage.

9. A process for preparing an alkyl aryl sulphonate which comprises bringing into reaction an olefin, an aromatic compound having at least two replaceable nuclear hydrogen atoms, and an amount of concentrated sulphuric acid sufficient to partially, but only partially, complete the sulphonation reaction, separating the resulting aqueous acid phase from the reaction mixture, then adding additional concentrated sulphuric acid to complete the sulphonation reaction.

10. A process for preparing an alkyl aryl sulphonate which comprises bringing into reaction, in the presence of an inert diluent, an olefin, an aromatic compound having at least two replaceable nuclear hydrogen atoms, and an amount of concentrated sulphuric acid sufficient to partially, but only partially, complete the sulphonation reaction, separating the resulting aqueous acid phase from the reaction mixture, and adding additional concentrated sulphuric acid to complete the sulphonation reaction.

11. A process for preparing an alkyl aryl sulphonate which comprises bringing into reaction an olefin containing more than 8 carbon atoms, an aromatic compound having at least two replaceable nuclear hydrogen atoms, and an amount of concentrated sulphuric acid sufficient to partially, but only partially, complete the sulphonation reaction, in the presence of a diluent non-reactive with the sulphuric acid under reaction conditions, separating the resultant aqueous phase from the reaction mixture, and adding additional concentrated sulphuric acid to complete the sulphonation reaction.

12. A process for preparing an alkyl phenol sulphonate which comprises bringing into reaction, in the presence of naphtha, an isobutylene polymer, phenol and an amount of concentrated sulphuric acid sufficient to partially, but only partially, complete the sulphonation reaction, separating the resultant aqueous acid phase from the reaction mixture, then adding additional concentrated sulphuric acid to complete the sulphonation reaction.

HYYM E. BUC.